Patented Mar. 8, 1938

2,110,613

UNITED STATES PATENT OFFICE 2,110,613

PROCESS FOR REDUCING FOAM OF FERMENTED EGG WHITE TO LIQUID ALBUMEN AND THINNING FRESH EGG WHITES

Theodore L. Swenson, Chevy Chase, Md.; dedicated to the free use of the People of the United States of America No Drawing. Application October 20, 1937, Serial No. 170,012

3 Claims. (Cl. 99—13)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People of the United States of America to take effect on the granting of a patent to me.

This invention relates to a process for reconverting the foam produced by fermented egg white into a liquid albumen and is also applicable for the purpose of thinning fresh egg whites.

In many commercial establishments liquid egg white is allowed to thin down through natural fermentation. This fermentation is greatly accelerated in a warm room, as a result of which a heavy spongy, stringy mass of foam collects on top. This foam does not become thin upon continued standing even when separated from the liquid mass and it is acid in reaction (about pH 5.5).

The patent granted to Arnold K. Balls and me, No. 2,073,411, involves a process of treating fresh egg white by mixing a proteolytic enzyme, such as trypsin, with the egg white and maintaining the mixture at a temperature favorable to the enzyme action until the thick portion of the egg white is thinned to a desired consistency. In the present invention, after natural fermentation has proceeded to the desired point, the foam is separated from the liquid and placed in another vessel. A suitable acid, such as citric acid, is then added to the foam in the approximate proportion of 1 part acid to 45 parts of foam, and stirred well in order to bring the material to a pH value favorable to the action of the ferment, which pH value is between the limits 4.7 and 6.9. A proteolytic enzyme which will act in an acid medium such as pepsin, papain and bromelin is then dissolved in a small amount of citric acid and this solution is added to the foam in the approximate proportion of 1 part enzyme to 10,000 parts of foam. This mixture is then allowed to stand for a few hours after which the foam is reduced to a clean sweet liquid albumen which may then be neutralized and dried. The dried product is clean and sweet and upon reconstitution renders an excellent whip resulting in a high grade meringue.

The above process may also be utilized for the purpose of thinning fresh egg whites preparatory to drying and when so used, the development of the undesirable foam is reduced to a negligible quantity.

Having thus described my invention, I claim:

1. A process of treating the foam of fermented egg white, which process comprises adjusting the pH of the foam to a value of 4.7 to 6.9 and mixing with it a proteolytic enzyme which will act in an acid medium.

2. A process for reclaiming liquid albumen from the foam of fermented egg white, which process comprises adjusting the pH to a value of 4.7 to 6.9 and mixing with it a solution of an enzyme chosen from the group consisting of pepsin, papain, and bromelin.

3. The process of reclaiming a liquid albumen from the foam of fermented egg white, which process comprises adjusting the pH of the foam by adding citric acid in the proportion of 1 part citric acid to 45 parts of foam, and then mixing with it a solution of pepsin in the proportion of 1 part pepsin to 10,000 parts of foam.

THEODORE L. SWENSON.